(12) United States Patent
Chastain

(10) Patent No.: US 10,505,901 B2
(45) Date of Patent: *Dec. 10, 2019

(54) PROVIDING A BASIC FIREWALL USING A VIRTUAL NETWORKING FUNCTION

(71) Applicant: AT&T Intellectual Property I, L.P., Atlanta, GA (US)

(72) Inventor: W. Cooper Chastain, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/212,741

(22) Filed: Dec. 7, 2018

(65) Prior Publication Data

US 2019/0109827 A1  Apr. 11, 2019

Related U.S. Application Data

(63) Continuation of application No. 14/823,466, filed on Aug. 11, 2015, now Pat. No. 10,154,009.

(51) Int. Cl.

| H04L 29/06 | (2006.01) |
|---|---|
| H04W 12/08 | (2009.01) |
| H04L 12/715 | (2013.01) |
| G06F 9/455 | (2018.01) |

(52) U.S. Cl.
CPC ...... *H04L 63/0272* (2013.01); *G06F 9/45558* (2013.01); *H04L 45/64* (2013.01); *H04W 12/08* (2013.01); *G06F 2009/45595* (2013.01); *H04L 63/0236* (2013.01)

(58) Field of Classification Search
CPC .. H04L 63/0272; H04L 45/64; G06F 9/45558
USPC .......................................................... 726/15
See application file for complete search history.

(56) References Cited

U.S. PATENT DOCUMENTS

| 8,528,070 | B2 | 9/2013 | Stiekes et al. |
|---|---|---|---|
| 9,015,823 | B2 | 4/2015 | Koponen et al. |
| 9,674,103 | B2 * | 6/2017 | Brown ................. H04L 47/323 |
| 2013/0121207 | A1 | 5/2013 | Parker |

(Continued)

OTHER PUBLICATIONS

U.S. Office Action dated Apr. 3, 2017 in U.S. Appl. No. 14/823,466.

(Continued)

*Primary Examiner* — Dant B Shaifer Harriman
(74) *Attorney, Agent, or Firm* — Hartman & Citrin LLC

(57) ABSTRACT

Concepts and technologies are disclosed herein for providing a basic firewall using a virtual networking function. A control system having a processor can detect a firewall request that can include a request to create a basic firewall. The processor can analyze a recipe to determine a virtual switch and a basic firewall virtual function that are to provide the functionality of the basic firewall. The processor can trigger instantiation of the virtual switch via a network control function and instantiation of the basic firewall virtual function via a service control function. The processor also can validate the basic firewall. The basic firewall can provide filtering of traffic at the network transport layer using the virtual switch, and as such, the virtual switch may not operate on the application layer.

20 Claims, 8 Drawing Sheets

(56) References Cited

U.S. PATENT DOCUMENTS

| | | | |
|---|---|---|---|
| 2014/0245423 A1* | 8/2014 | Lee | H04L 63/0218 726/12 |
| 2014/0337500 A1* | 11/2014 | Lee | H04L 41/12 709/223 |
| 2014/0344913 A1* | 11/2014 | Stahl | H04L 12/1403 726/11 |
| 2014/0351648 A1 | 11/2014 | Madani et al. | |
| 2015/0040121 A1* | 2/2015 | Barabash | G06F 9/45558 718/1 |
| 2015/0085868 A1* | 3/2015 | Snyder, II | G06F 9/45558 370/401 |
| 2015/0100560 A1* | 4/2015 | Davie | H04L 45/16 707/703 |
| 2016/0094650 A1* | 3/2016 | Garcia de Rio | H04L 47/78 709/226 |

OTHER PUBLICATIONS

U.S. Office Action dated Oct. 4, 2017 in U.S. Appl. No. 14/823,466.
U.S. Office Action dated Mar. 15, 2018 in U.S. Appl. No. 14/823,466.
U.S. Notice of Allowance dated Jul. 18, 2018 in U.S. Appl. No. 14/823,466.

* cited by examiner

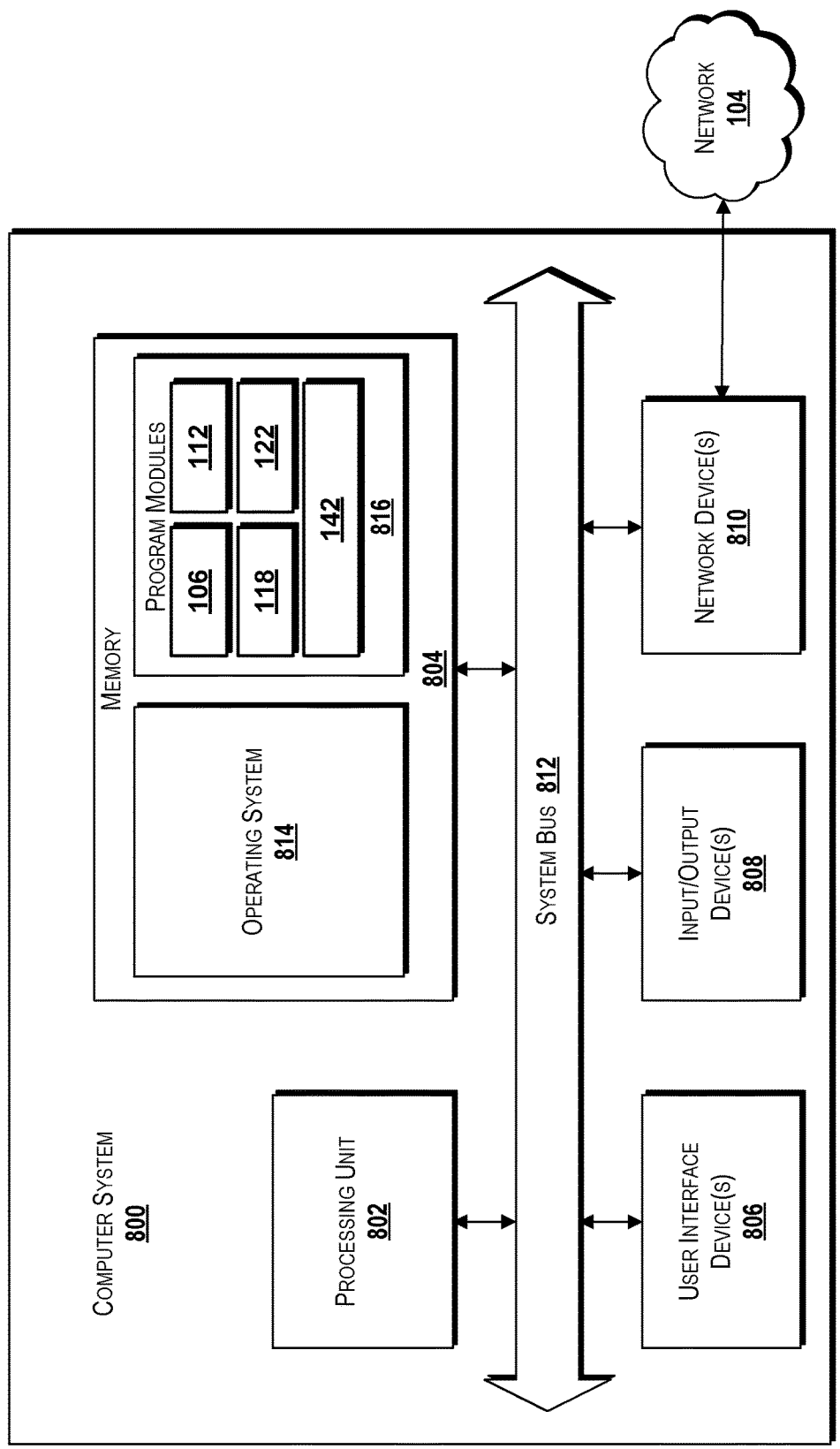

PROVIDING A BASIC FIREWALL USING A VIRTUAL NETWORKING FUNCTION

CROSS-REFERENCE TO RELATED APPLICATIONS

This application is a continuation of and claims priority to U.S. patent application Ser. No. 14/823,466, entitled "Providing a Basic Firewall Using a Virtual Networking Function," filed Aug. 11, 2015, now U.S. Pat. No. 10,154,009, which is incorporated herein by reference in its entirety.

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which can allow flexibility in terms of scaling, locating, and/or using the services. Building services that were designed for deployment on dedicated infrastructure and instead deploying these same services in a virtualized infrastructure may not provide the benefits of using a virtualized network. Similarly, accommodating message routing between service components used to provide a virtualized service may require increased complexity of the virtualized service relative to services built on a dedicated infrastructure. Thus, while virtualization may provide flexibility to network operators and other entities, several challenges pose difficulties in migrating services to virtualized networks.

SUMMARY

The present disclosure is directed to providing a basic firewall using a virtual networking function. A computing device can host a control system, which can include multiple modules or applications that can be used to create, validate, and/or manage one or more basic firewalls. The basic firewall can be created as a standalone entity by the control system and can be chained to one or more services. The basic firewall can include a virtual switch and a basic firewall virtual function. The basic firewall virtual function can be created, modified, managed, and/or terminated by the service control and the virtual switch can be created, modified, managed, and/or terminated by the network control. Traffic can be routed to the basic firewall from various sources such as services, functions, or the like.

The control system can detect a request for a basic firewall. In some embodiments, the control system (or an operations management controller of the control system) can analyze one or more recipes (or policies or rules) to determine how to create the basic firewall. In some embodiments, the control system can access a service creation database to identify one or more "recipes" that can be used to create the basic firewall. The recipes can define service components including hardware, software, and/or transport as well as basic firewalls and/or components of the basic firewalls.

The control system can access an inventory of resources to determine if resources needed to support the new basic firewall are available. The control system can identify a service control function that is to control a basic firewall virtual function of the basic firewall and a network control function that is to control a virtual switch of the basic firewall. The control system can, via an infrastructure control, instantiate one or more virtual machines and load and validate basic firewalls components (e.g., basic firewall virtual functions and/or virtual switches) to the virtual machines.

According to various embodiments of the concepts and technologies described herein, the basic firewall can be configured by firewall configuration data. The firewall configuration data can define how traffic or other data will be inspected by the basic firewall as well as actions, if any, the basic firewall should take with respect to the traffic and/or data flows. According to various embodiments, the basic firewall can be configured by firewall configuration data that can be obtained via one or more application programming interfaces ("APIs"). The firewall configuration data can define actions to take with respect to traffic. According to the embodiments of the concepts and technologies described herein, these actions can include allowing or blocking the traffic.

According to various embodiments, the basic firewall virtual function can direct the network control function of the control system to create SDN configuration data (or prompt the network control to create the SDN configuration data by forwarding configuration data to the network control). The SDN configuration data can be used by the network control to configure the virtual switch. Thus, the basic firewall can be configured via configuration data obtained via an API and/or can create configuration data that configures the virtual switch of the basic firewall. The virtual switch can effect filtering of traffic at the transport layer without involvement from entities on the application layer (other than configuration). It should be understood that this example is illustrative and therefore should not be construed as being limiting in any way.

According to one aspect of the concepts and technologies disclosed herein, a method is disclosed. The method can include detecting, at a control system including a processor, a firewall request including a request to create a basic firewall. The processor can analyze a recipe to determine a virtual switch and a basic firewall virtual function that is to provide the functionality of the basic firewall and trigger instantiation of the virtual switch via a network control function and instantiation of the basic firewall virtual function via a service control function. The processor also can validate the basic firewall. The basic firewall can provide filtering of traffic at the network transport layer using the virtual switch. The virtual switch may not operate on the application layer.

In some embodiments, the virtual switch can be controlled by a network control function and the basic firewall virtual function can be controlled by a service control function. In some embodiments, the network control function can control the virtual switch using software defined networking configuration data. In some embodiments, the basic firewall virtual function can be configured by firewall configuration data received by the basic firewall virtual function via an application programming interface exposed by the basic firewall virtual function. In some embodiments, the basic firewall virtual function can direct the network control function of the control system to create software defined networking configuration data that can be used to configure the virtual switch or prompt the network control function directly, or via the service control function, to create the software defined networking configuration data by forwarding the firewall configuration data to the network control). In some embodiments, the basic firewall can filter traffic by accessing a match action table, applying the match action table and the software defined networking configuration data to a header associated with a data packet included in the traffic, and determining, based on the comparing, if the traffic is to be blocked. In some embodiments, the match action table can be provided to the virtual switch by the network control function.

According to another aspect of the concepts and technologies disclosed herein, a system is disclosed. The system can include a processor and a memory. The memory can store computer-executable instructions that, when executed by the processor, cause the processor to perform operations. The operations can include detecting a firewall request including a request to create a basic firewall, analyzing a recipe to determine a virtual switch and a basic firewall virtual function that is to provide the functionality of the basic firewall, triggering instantiation of the virtual switch via a network control function and instantiation of the basic firewall virtual function via a service control function, and validating the basic firewall. The basic firewall can provide filtering of traffic at the network transport layer using the virtual switch, and the virtual switch does not operate on the application layer.

In some embodiments, the virtual switch can be controlled by a network control function and the basic firewall virtual function can be controlled by a service control function. In some embodiments, the network control function can control the virtual switch using software defined networking configuration data. In some embodiments, the basic firewall virtual function can be configured by firewall configuration data received by the basic firewall virtual function via an application programming interface exposed by the basic firewall virtual function. In some embodiments, the basic firewall virtual function can direct the network control function of the control system to create software defined networking configuration data that can be used to configure the virtual switch (or prompt the network control function directly, or via the service control function, to create the software defined networking configuration data by forwarding the firewall configuration data to the network control). In some embodiments, the basic firewall can filter traffic by accessing a match action table, applying the match action table and the software defined networking configuration data to a header associated with a data packet included in the traffic, and determining, based on the comparing, if the traffic is to be blocked. In some embodiments, the match action table can be provided to the virtual switch by the network control function.

According to yet another aspect of the concepts and technologies disclosed herein, a computer storage medium is disclosed. The computer storage medium can have computer-executable instructions stored thereon that, when executed by a processor, cause the processor to perform operations. The operations can include detecting a firewall request including a request to create a basic firewall, analyzing a recipe to determine a virtual switch and a basic firewall virtual function that is to provide the functionality of the basic firewall, triggering instantiation of the virtual switch via a network control function and instantiation of the basic firewall virtual function via a service control function, and validating the basic firewall. The basic firewall can provide filtering of traffic at the network transport layer using the virtual switch, and the virtual switch does not operate on the application layer.

In some embodiments, the virtual switch can be controlled by a network control function and the basic firewall virtual function can be controlled by a service control function. In some embodiments, the network control function can control the virtual switch using software defined networking configuration data. In some embodiments, the basic firewall virtual function can be configured by firewall configuration data received by the basic firewall virtual function via an application programming interface exposed by the basic firewall virtual function. In some embodiments, the basic firewall virtual function can direct the network control function of the control system to create software defined networking configuration data that can be used to configure the virtual switch (or prompt the network control function directly, or via the service control function, to create the software defined networking configuration data by forwarding the firewall configuration data to the network control). In some embodiments, the basic firewall can filter traffic by accessing a match action table, applying the match action table and the software defined networking configuration data to a header associated with a data packet included in the traffic, and determining, based on the comparing, if the traffic is to be blocked.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIG. 8 is a block diagram illustrating an example computer system configured to create, provide, and/or interact with a basic firewall virtual function, according to some illustrative embodiments of the concepts and technologies described herein.

DETAILED DESCRIPTION

Figure 1:
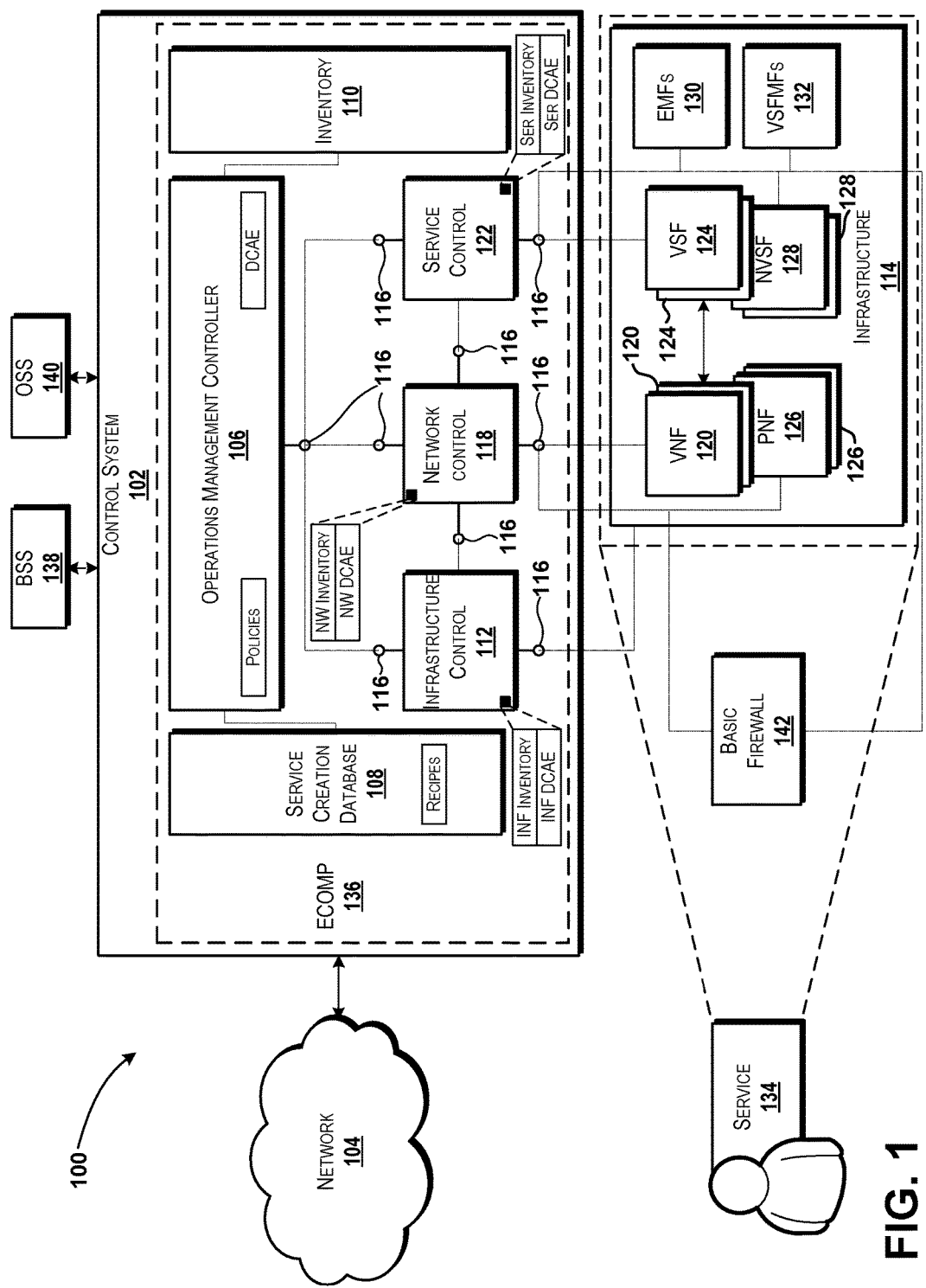
FIG. 1 is a system diagram illustrating an illustrative operating environment for various embodiments of the concepts and technologies described herein.

The following detailed description is directed to providing a basic firewall using a virtual networking function. A computing device can host a control system, which can include multiple modules or applications that can be used to create, validate, and/or manage one or more basic firewalls.

The basic firewall can be created as a standalone entity by the control system and can be, chained to one or more services. The basic firewall can include a virtual switch and a basic firewall virtual function. The basic firewall virtual function can be created, modified, managed, and/or terminated by the service control and the virtual switch can be created, modified, managed, and/or terminated by the network control.

According to various embodiments of the concepts and technologies described herein, the basic firewall can be configured by firewall configuration data. The firewall configuration data can define how traffic or other data will be inspected by the basic firewall as well as actions, if any, the basic firewall should take with respect to the traffic and/or data flows. According to various embodiments, the basic firewall can be configured by firewall configuration data that can be obtained via one or more APIs. The firewall configuration data can define actions to take with respect to traffic. According to the embodiments of the concepts and technologies described herein, these actions can include allowing or blocking the traffic.

According to various embodiments, the basic firewall virtual can create SDN configuration data via a network control function of the control system (or prompt the network control to create the SDN configuration data by forwarding configuration data to the network control). The SDN configuration data can be used by the network control to configure the virtual switch. Thus, the basic firewall can be configured via configuration data obtained via an API and/or can create configuration data that configures the virtual switch of the basic firewall. The virtual switch can effect filtering of traffic at the transport layer without involvement from entities on the application layer (other than configuration). It should be understood that this example is illustrative and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing a basic firewall using a virtual networking function will be described, according to an illustrative embodiment. The operating environment 100 shown in FIG. 1 includes a computing device or system (hereinafter referred to as a "control system") 102. The control system 102 can host a network control framework. The control system 102 can operate on, in communication with, and/or as a part of a communications network ("network") 104. Additional aspects of the network 104 are illustrated and described below with reference to FIG. 7. Briefly, it should be understood that the network 104 can include almost any type of computer network as well as communications networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two or more similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The control system 102 can execute an operating system (not shown in FIG. 1) and one or more application programs, modules, or other computer-executable instructions that, when executed by a processor (not shown in FIG. 1) of the control system 102 can provide the functionality illustrated and described herein. The operating system can include a computer program for controlling the operation of the device, and the application programs, modules, or other computer-executable instructions can include executable programs configured to execute on top of the operating system to provide various functions as illustrated and described herein.

Although the control system 102 is illustrated and described in FIG. 1 as including multiple modules, components, and/or other elements, it should be understood that the functionality of these modules, components, and/or elements can be provided by application modules executed by a single device, in some embodiments. In some other embodiments, the functionality of the modules, components, and/or elements can be provided by multiple devices. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services, as well as creation, validation, and/or management of basic firewall elements as will be illustrated and described in further detail herein.

According to various embodiments of the concepts and technologies described herein, the operations management controller 106 can manage services and/or basic firewall elements across multiple "scopes" or "domains." As used herein, a scope, scope domain, and/or domain can be used to refer to aspects of the concepts and technologies described herein and can include, but are not necessarily limited to, an infrastructure scope, a network scope, and a service or application ("service") scope. The operations management controller 106 also can control and orchestrate service creation and management; validation of services and/or service components; as well as creation, management, and validation of basic firewall functionality as will be illustrated and described herein.

The operations management controller 106 can serve as a master service orchestrator ("MSO") for the control system 102. The operations management controller 106 can instantiate new services and/or basic firewalls based upon "recipes" that can be stored in a service creation database 108 or elsewhere as illustrated and described herein. The operations management controller 106 also can use information stored in the inventory 110 when creating new services and/or basic firewalls. As will be explained in more detail hereinbelow, services can include basic firewall functionality, in some embodiments, while in some other embodiments the basic firewall functionality can be embodied by standalone basic firewalls that can be chained to services and/or located between multiple services, yet can operate independently of other services. The operations management controller 106 also can instantiate scope control domain entities (e.g., controllers for infrastructure, network resources, and/or service functions), as will be explained in more detail below.

The operations management controller 106 can handle messages and/or exceptions that can be generated by the operations management controller 106 and/or exceptions that may be passed to the operations management controller 106 from the scope control domain (e.g., the controllers for the infrastructure, network resources, and/or the service functions) as will be illustrated and described below in more detail. In some embodiments, basic firewalls can generate events and/or reports that can be routed to and/or handled by the operations management controller 106 or other entities, as will be illustrated and described in more detail below.

The operations management controller 106 also can run one or more high level data collection, analytics, and event handling ("DCAE") processes to analyze data or events relating to services, basic firewalls, and/or the various components for managing the services, basic firewalls, and/or their associated infrastructure, network, and service components. The operations management controller 106 also can run a policy decision function using a high level set of policies for service creation, control, and/or validation as well as basic firewall creation, control, validation, and the like.

As mentioned above, the service creation database 108 can define products and services using definitions of components of services such as hardware, software, and/or transport that can be referred to herein as "recipes" or "service recipes." The recipes for services can define one or more basic firewalls or components, in some embodiments, while in some other embodiments the basic firewalls and/or components can have basic firewall recipes that can be stored in the service creation database 108. The recipes can specify one or more components of a service and/or a basic firewall as well as processes or operations for putting the service and/or basic firewall components together.

As such, it can be appreciated that the service and/or basic firewall recipes may involve a service scope (e.g., a set of service or application functions), a network scope (e.g., a set of network functions and/or information indicating how network transport is to be established, maintained, and/or used), and an infrastructure scope (e.g., where on the network 104 or other hardware the network and service functions are to be located). The recipes also can implicitly or explicitly specify whether the various components of the service and/or basic firewall should be chained together or if the components should operate independently of one another. It should be understood that the term "service" as used herein can include an "application." Thus, it should be understood that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or elsewhere. For example, in some embodiments the inventory 110 can reside and/or can be represented by an inventory and/or data structure that is hosted by the control system 102, the network 104, and/or elsewhere. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory 110 may be divided across the scope controllers (described in further detail below) so that each controller can have a local inventory that relates to that controller's scope. A controller for the infrastructure domain, for example, can maintain an infrastructure inventory. Similarly, controllers for network and service scopes can maintain scope-specific inventories. Even if scope-specific inventories are provided, the inventory 110 still can provide end-to-end viewing capability for a divided or distributed inventory embodiment, if desired. It should be understood that this example is illustrative and therefore should not be construed as being limiting in any way.

According to various embodiments, the operations management controller 106 can communicate with one or more infrastructure control elements or controllers (collectively referred to herein as "infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to some embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management API 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter collectively referred to as the "network control") 118 via an SDN API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below. The infrastructure control 112 also can load basic firewalls to the VMs and/or can include basic firewall functionality in VM images that can be loaded to the VMs. These and other aspects of creating basic firewalls will be explained in more detail below, particularly with reference to FIGS. 2-8.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter collectively referred to as the "service control") 122 to receive instructions for instantiating one or more virtual service functions ("VSFs") 124 within the infrastructure 114 as well as receive instructions for instantiating one or more basic firewalls and/or basic firewall components as will be illustrated and described in more detail below. A VSF 124 can include a virtualized application or application component, and can be used to create other services of various types including, but not limited to, basic services, segmented services, and/or composite services. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service and/or basic firewall. According to various embodiments, the transport network between one or more components of a service and/or basic firewall components can be created by creating a group of one or more VNFs 120 within the infrastructure 114. The transport network also can include physical network functions ("PNFs") 126, which can be selected from an available inventory of physical resources, configured, and/or controlled by the network control 118.

The transport network can include various VNFs 120, PNFs 126, and/or other networking functions. The PNFs 126 can include, for example, European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions, which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or some infrastructure networking functions, if controlled or controllable by the network control 118. The network control 118 also can be instructed by the service control 122 and/or the operations management controller 106 to create, modify, and/or terminate one or more basic firewall components such as a virtual switch (not shown in FIG. 1). The creation, configuration, and validation of the virtual switch will be illustrated and described in more detail below, particularly with reference to FIGS. 2-6. These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118)), or the like, can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with the service control 122. The service control 122 can be responsible for management, deployment, operation, and coordination of services. Services can be provided by and/or can include one or more VSFs 124, non-virtualized service functions ("NVSFs") 128, one or more EMFs 130, one or more VSF management functions (labeled "VSFMFs" in FIG. 1) 132, combinations thereof, or the like.

According to various embodiments, the services, service components, basic firewalls, and/or basic firewall components can be created by the service control 122 by creating a group of one or more VSFs 124, NVSFs 128, and/or basic firewall virtual functions (not shown in FIG. 1) within the infrastructure 114. Thus, it should be understood that the NVSFs 128 can be created and/or controlled by the service control 122. It also should be understood that the operations management controller 106 can create or prompt creation of the VSFs 124 and initiate requests to the infrastructure 114 and network control 118. As such, it should be understood that the operations management controller 106 and/or the service control 122 can create a service, and/or a basic firewall virtual function, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128; as well as basic firewalls and/or basic firewall components as will be illustrated and described in more detail below. The service control 122 also can handle service scope exceptions, in some embodiments. As noted above, the operations management controller 106 also can create services, service components, service functions, basic firewalls, and/or basic firewall components depending upon the degree to which the operations management controller 106 delegates control to the service control 122. It should be understood that these example components of the service control 122 are illustrative and therefore should not be construed as being limiting in any way.

The service control 122 can be responsible for management and control of services, components or functions of the services, basic firewalls, and/or components of the basic firewalls. According to various embodiments, the service control 122 can manage VSFs 124 and/or NVSFs 128 of services being controlled as well as components of the basic firewalls illustrated and described herein. The service control 122 also can handle service EMFs, which can manage FCAPS for services being controlled. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like, as well as to create, modify, and/or terminate one or more basic firewalls and/or basic firewall components. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service-related transport, network functions associated with a basic firewall, and/or basic firewall transport (e.g., transport between components of the basic firewalls). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 the NVSFs 128, the EMFs 130, the VSF management functions 132, and/or combinations thereof, the control system 102 can create a service 134 on the infrastructure 114. It should be understood that this example is illustrative and therefore should not be construed as being limiting in any way.

According to various embodiments, the control system 102 can integrate an enhanced control, orchestration, management, and policy framework (hereinafter referred to as "ECOMP") 136, which can be integrated into the control system 102. The ECOMP 136 can enable rapid service creation by combining pre-built components and/or functions. The ECOMP 136 also can enable dynamically elastic capacity management by enabling scaling and instantiation. The ECOMP 136 also can support control functions. The control functions can be driven by real-time analytics and policy decisions.

The ECOMP 136 also can support unified operations, administration, and management across the three scopes (e.g., infrastructure, network, and service). The ECOMP 136 also can support optimization of basic firewalls and/or services 134 and/or the components of the basic firewalls and/or services 134, analytics of the basic firewalls and/or the services 134, components thereof, and/or the various components of the control system 102. As illustrated and described in the FIGURES, the ECOMP 136 can be an element of the control system 102, in some embodiments, while in other embodiments the control system 102 can correspond to an embodiment of the ECOMP 136. It should be understood that these examples are illustrative and therefore should not be construed as being limiting in any way.

The ECOMP 136 can include a service design and creation ("SDC") environment, an active and available inventory ("AAI"), an operations management framework ("OMF"), and/or a service, infrastructure, and/or network control. Thus, the ECOMP 136 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 136 can enable developers, service designers, network planners/engineers, operations planners and product managers, other entities, or the like, to create, organize, prototype, and deploy services 134. In some embodiments, service definitions can be instantiated by the OMF and the resulting service instances can be recorded in the AAI. According to various embodiments, components associated with a service 134 can be created in the SDC component and stored as recipes. Thus, the SDC component can store recipes for VSF components, VSFs 124, service components, basic firewalls, basic firewall components, and various network and/or infrastructure resources. The recipes also can indicate whether or not various components of the basic firewalls and/or the services 134 are to be chained together or are to operate independently of one another. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 138 and one or more operations support system ("OSS") 140. The BSS 138 and the OSS 140 can be external to the ECOMP 136, in some embodiments. The BSS 138 and the OSS 140 can interact with customers and operations in support of activities and aggregate capabilities across services within and outside of the operating environment 100.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 136 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

As shown in FIG. 1, the control system 102 also can be used to create, validate, and/or manage one or more basic firewalls 142. The basic firewall 142 can be created as a service 134 by the control system 102, as a component of the service 134, and/or as an independent function or application as illustrated and described herein. According to various embodiments of the concepts and technologies described herein, as will be more clearly understood with reference to FIG. 2 below, the basic firewall 142 can be provided in the transport layer of the operating environment 100 and can include one or more VNFs 120 and one or more VSFs 124. It should be understood that this example is illustrative and therefore should not be construed as being limiting in any way.

The control system 102 can be configured to chain the basic firewall 142 to other services 134, and the basic firewall 142 can operate independently of any service 134. According to various embodiments of the concepts and technologies described herein, the basic firewall 142 is not created as part of any other application or service, and therefore operates independently of other VSFs 124 and/or or other virtualized service or application functions. Thus, in various embodiments, the basic firewall 142 can be created as a standalone component that can provide the functionality illustrated and described herein for providing a basic firewall in a virtualized environment without being dependent upon or created as a part of any service 134. It should be understood that this example is illustrative and therefore should not be construed as being limiting in any way.

Figure 2:
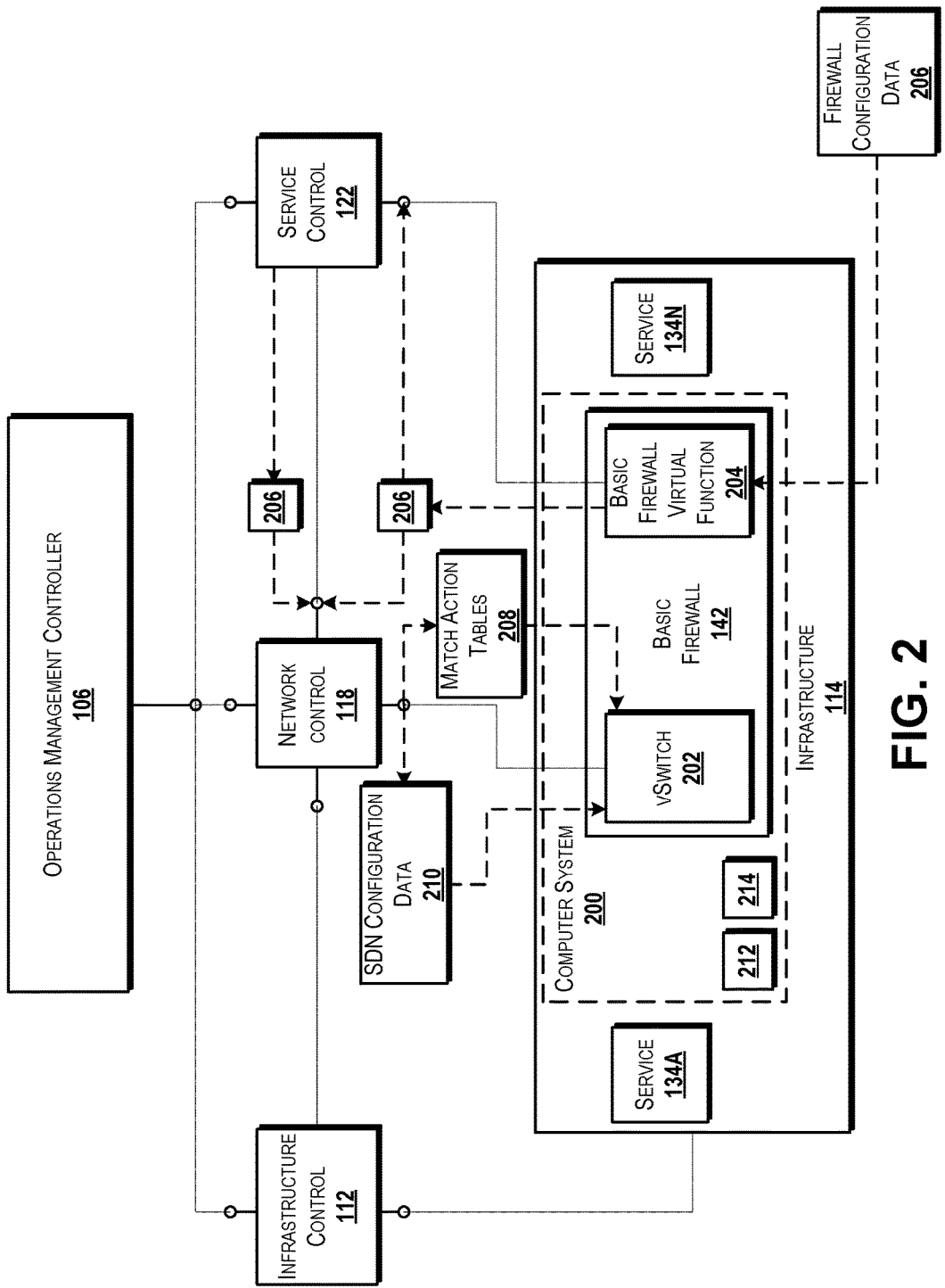
FIG. 2 is a system diagram illustrating additional aspects of various embodiments of the concepts and technologies described herein.

The components of the basic firewall 142 will be illustrated and described in more detail herein, particularly with reference to FIG. 2. Briefly, embodiments of the concepts and technologies described herein provide a basic firewall 142. As used herein and in the claims, the phrase "basic firewall" refers to functionality that can allow or block traffic without performing detailed analysis of traffic packet payloads and/or without detailed analysis of traffic packet headers. As will be explained in more detail below, the basic firewall 142 disclosed herein can be provided by a virtual switch and a basic firewall virtual function. The basic firewall virtual function can be provided solely to receive configuration information via an API associated with the basic firewall virtual function and/or a host for that function.

By creating a basic firewall 142 in this manner (without tying the firewall functionality to other services 134 and/or creating the firewall as a service 134), the concepts and technologies described herein can be used to enable creation of basic firewalls 142 using the same template repeatedly. Thus, when a request for a firewall is received, the concepts and technologies described herein can enable creation of a basic firewall 142 based on a single recipe or template, thereby streamlining the creation of the basic firewall 142 and obviating heavy involvement by the service control 122 and/or other application creation entities. It should be understood that this example is illustrative and therefore should not be construed as being limiting in any way.

As will be explained in more detail below, the basic firewall virtual function can be configured to forward the configuration information to a network control function, which in turn can configure the virtual switch to provide the functionality illustrated and described herein for the basic firewall 142. More particularly, the virtual switch can perform the inspection of traffic and action on the traffic in the transport layer based on match action tables. Thus, the basic firewall virtual function and/or other components of the application layer are not involved in analyzing traffic and/or making decisions on the traffic. Rather, these decisions are made solely in the transport layer (by the virtual switch). Thus, the functionality of the basic firewall 142 is not incorporated into the services 134 and/or built into applications. Rather, as noted above, the functionality of the basic firewall 142 is provided by the virtual switch, as will be explained in more detail below.

According to various embodiments, the basic firewall virtual function can be created, modified, managed, and/or terminated by the service control 122 and the virtual switch can be created, modified, managed, and/or terminated by the network control 118. Again, as noted above, the functionality of the basic firewall 142 can primarily be performed by the virtual switch in the transport layer (and not at the application layer), which is controlled by the network control 118. Thus, the basic firewall 142 performs traffic filtering independently of any services 134 and/or other application components, and without involvement of the service control 122. The configuration of these and other components of the basic firewall 142 will be illustrated and described in more detail below.

According to various embodiments of the concepts and technologies described herein, the basic firewall 142 can operate independently, as noted above. Thus, traffic can be routed to the basic firewall 142 from various sources such as the service 134, other services, or the like. In some other embodiments, the basic firewall 142 can be located between multiple services 134. These and other embodiments will be illustrated and described in more detail below.

In practice, the operations management controller 106 can detect a request for a basic firewall 142. For example, the operations management controller 106 can detect a request to configure or reconfigure a basic firewall 142 or a request for a new basic firewall 142. In some embodiments of creating basic firewalls 142, the operations management controller 106 can analyze one or more policies to determine how the creation of the basic firewall 142 should be handled.

The operations management controller 106 also can access the service creation database 108 to identify one or more "recipes" that can be used to create the basic firewall 142. The recipes can define hardware, software, and/or transport of the basic firewalls 142 and/or components of the basic firewalls 142. The recipes also can define whether the basic firewalls 142 are to be created between two or more services 134. The basic firewall 142 is created as a standalone and independent basic firewall 142 that does not rely upon the services 134 in any way to provide its functionality as illustrated and described herein. The operations management controller 106 or other components of the control system 102 also can identify existing resources to provide the components of the basic firewall 142 instead of instantiating these components.

The operations management controller 106 can access the inventory 110 to determine if the resources needed to support the new basic firewall 142 are available for use. The operations management controller 106 also can identify a service control function that is to control the basic firewall 142 and allocate or create the service control function. Thus, the operations management controller 106 can select, allocate, and/or create the service control function that is to control the basic firewall 142.

The operations management controller 106 can instruct the infrastructure control 112 to instantiate one or more VMs and virtual switches and to load and validate components of the basic firewall 142 (e.g., basic firewall virtual functions and/or virtual switches) to the VMs. It should be understood that the infrastructure control 112 can also instruct the network control 118 to create or establish transport between the components of the basic firewall 142 and/or the VMs, the VNFs 120, the VSFs 124, and/or the service control 122. In a case of terminating a basic firewall 142, it can be appreciated that the network control 118 may de-allocate or tear down transport. The network control 118 can report events to the network DCAE and/or update the network inventory (and/or the inventory 110).

The service control 122 can receive instructions from the operations management controller 106 to instantiate or tear down one or more basic firewall virtual functions, in some embodiments. The service control 122 can report an event to a service DCAE and update the service inventory (and/or the inventory 110). The network control 118 also can receive instructions to establish transport between the new basic firewall virtual functions and report events to the network DCAE if instantiating a basic firewall 142, or can tear down network transport supporting basic firewall virtual functions and report events to the network DCAE if terminating a basic firewall 142. The network control 118 can establish transport using VNFs 120 and/or PNFs 126. The operations management controller 106 can validate the basic firewall 142 end-to-end and/or update the inventory 110.

According to various embodiments of the concepts and technologies described herein, the basic firewall 142 can be configured by configuration data. The configuration data can define how traffic or other data will be allowed or blocked by the basic firewall 142 as well as actions, if any, to take with respect to the traffic and/or data flows. According to various embodiments, the basic firewall 142 can be configured by configuration data that can be obtained via one or more APIs. The configuration data can define actions to take with respect to traffic. According to various embodiments of the concepts and technologies described herein, the basic firewall 142 can support only allowing the traffic or blocking the traffic.

According to various embodiments, the basic firewall virtual function of a basic firewall 142 can prompt creation of SDN configuration data by the network control 118. In some embodiments, for example, the basic firewall 142 (or the basic firewall virtual function thereof) can prompt the network control 118 to create the SDN configuration data by routing configuration data to the network control 118 directly or via the service control 122. The SDN configuration data can be used by the network control 118 to configure the virtual switch, as will be illustrated and described in more detail below with reference to FIG. 2. Thus, the basic firewall 142 can be configured via configuration data obtained via an API and/or can create configuration data that configures the basic firewall 142. These and other aspects of the basic firewalls 142 will be illustrated and described in more detail below.

FIG. 1 illustrates one control system 102, one network 104, one operations management controller 106, one service creation database 108, one inventory 110, one infrastructure control 112, one instance of infrastructure 114, one network control 118, one service control 122, one service 134, one ECOMP 136, one BSS 138, one OSS 140, and one basic firewall 142. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 134; zero, one, or more than one ECOMP 136; zero, one, or more than one BSS 138; zero, one, or more than one OSS 140; and/or zero, one, or more than one basic firewalls 142. As such, the illustrated embodiment should be understood as being illustrative, and should not be construed as being limiting in any way.

Turning now to FIG. 2, additional aspects of the basic firewall 142 are illustrated and described in detail. In particular, FIG. 2 shows the basic firewall 142 operating on the infrastructure 114. According to some embodiments, as shown in FIG. 2, the basic firewall 142 can be hosted and/or executed by a computer system 200. Although multiple services 134A-N (hereinafter collectively and/or generically referred to as "services 134") are shown as being executed and/or hosted by the same infrastructure 114 that hosts or includes the computer system 200, this is not necessarily the case. In particular, the services 134 and/or the basic firewalls 142 can be hosted and/or executed by different devices and/or infrastructure 114 in various embodiments. As such, the illustrated embodiment should be understood as being illustrative and therefore should not be construed as being limiting in any way.

The basic firewall 142 can include multiple components, in some embodiments, as explained above and as shown in FIG. 2. In particular, the basic firewall 142 can include a virtual switch 202 (labeled "vSwitch" in FIG. 2) and a basic firewall virtual function 204 (labeled "VF" in FIG. 3). The basic firewall 142 also can be configured by way of the firewall configuration data 206, as mentioned above. The virtual switch 202, the basic firewall virtual function 204, and the firewall configuration data 206 will be described in additional detail below, as will other elements shown in FIG. 2.

As mentioned above, the virtual switch 202 can be created and/or controlled by one or more network control functions, which can be included in the network control 118 illustrated and described above with reference to FIG. 1. The virtual switch 202 can perform firewall functionality (analysis of traffic and action on the traffic based on the analysis) at the transport layer. Thus, the virtual switch 202 can block or allow traffic or other data flows. According to various embodiments of the concepts and technologies described herein, the basic firewall 142 can block or allow traffic and/or packets thereof based upon one or more match action tables 208, which can be provided to the virtual switch 202 by a network control function of the network control 118. It can be appreciated from the above description of the control system 102 that the virtual switch 202 can be instantiated by the operations management controller 106 or other entities, according to various embodiments.

According to various embodiments of the concepts and technologies described herein, the virtual switch 202 can be configured by SDN configuration data 210. The SDN configuration data 210 can be forwarded to the virtual switch 202 via the network control 118. In some embodiments, creation of the SDN configuration data 210 by the network control 118 can prompted by the basic firewall virtual function 204, as will be explained below. The creation of the SDN configuration data 210 by the network control 118 can be directly requested by the basic firewall 142 (or the basic firewall virtual function 204) or requested via the service control 122. The network control 118 can tailor functionality of the virtual switch 202 via the SDN configuration data 210 in some embodiments. It should be understood that this example is illustrative and therefore should not be construed as being limiting in any way.

According to various embodiments of the concepts and technologies described herein, the basic firewall virtual function 204 can be provided to receive configuration information (e.g., the firewall configuration data 206). The firewall configuration data 206 can be provided by a user of the basic firewall 142 and/or other entities. The basic firewall virtual function 204 also can forward the firewall configuration data 206 to the network control 118. The basic firewall 142 can be configured as a basic firewall API (not visible in FIG. 2, but can be exposed by the basic firewall virtual function 204). It should be understood that this example is illustrative and therefore should not be construed as being limiting in any way.

As mentioned above, the basic firewall virtual function 204 can forward the firewall configuration data 206 to the network control 118 and/or to the network control 118 via the service control 122 for generation of the SDN configuration data 210 at the network control 118. The basic firewall virtual function 204 therefore can, by way of prompting generation of the SDN configuration data 210, instruct a network control function of the network control 118 to configure the virtual switch 202 by way of the SDN configuration data 210. Thus, the basic firewall virtual function 204 can instruct the network control function to configure the virtual switch 202 to block or allow traffic. In some embodiments, the basic firewall virtual function 204 can request the network control 118 create the SDN configuration data 210 directly or via the service control 122 for routing to the network control 118. Both embodiments are shown in FIG. 2.

Thus, the firewall configuration data 206 can be used to define how the basic firewall 142 will inspect traffic or other data at the basic firewall 142. The firewall configuration data 206 can include instructions that can describe what packets will be inspected by the basic firewall 142; what addresses, sources, or destinations of packets will be examined, blocked, or allowed; what actions will be taken with respect to the traffic; combinations thereof; or the like. The firewall configuration data 206 can be provided to the basic firewall virtual function 204 via an API exposed by the basic firewall virtual function 204, a system that executes or hosts the basic firewall 142, other devices, combinations thereof, or the like. In some embodiments, the firewall configuration data 206 can be received via a basic firewall application programming interface (not shown in FIG. 2) and therefore it can be appreciated that the basic firewall 142 can be configured remotely. It should be understood that this example is illustrative and therefore should not be construed as being limiting in any way.

Thus, it can be appreciated that the basic firewall 142 can be configured to inspect traffic or other data flows that flow into the basic firewall 142. According to various embodiments of the concepts and technologies described herein, the basic firewall 142 can inspect the traffic based upon a set of configuration data, illustrated and described herein as firewall configuration data 206. The basic firewall 142 can perform actions based upon the firewall configuration data 206. In particular, the actions can include blocking the traffic or allowing the traffic.

As shown in FIG. 2, the basic firewall 142 and/or the infrastructure 114 that hosts the basic firewall 142 can be hosted or executed by the computer system 200. The computer system 200 can include a memory 212 and a processor 214. The computer system 200 can, via execution of computer-executable instructions stored in the memory 212 by the processor 214, provide the functionality illustrated and described herein with reference to the basic firewall 142. Various methods or processes associated with the basic firewall 142 are illustrated and described herein, particularly with reference to FIGS. 4-6. An example architecture of the computer system 200 is illustrated and described herein with reference to FIG. 8. It should be understood that these examples are illustrative and therefore should not be construed as being limiting in any way.

As shown in FIG. 2, the basic firewall 142 can be created as a standalone function. The basic firewall 142 can be chained to one or more services 134. Thus, the basic firewall 142 can have its own service control function and can be chained to other services 134 by the MSO, if desired. According to various embodiments, the basic firewall 142 can be chained to services 134 by inserting the basic firewall 142 between an (N−1)th service 134(N−1) and an Nth service 134N. According to various embodiments, the operations management controller 106 (which can include functionality associated with an MSO in various embodiments) can insert the basic firewall 142 between the two or more services 134 using an SDN controlled switch such as the virtual switch 202.

Figure 3:
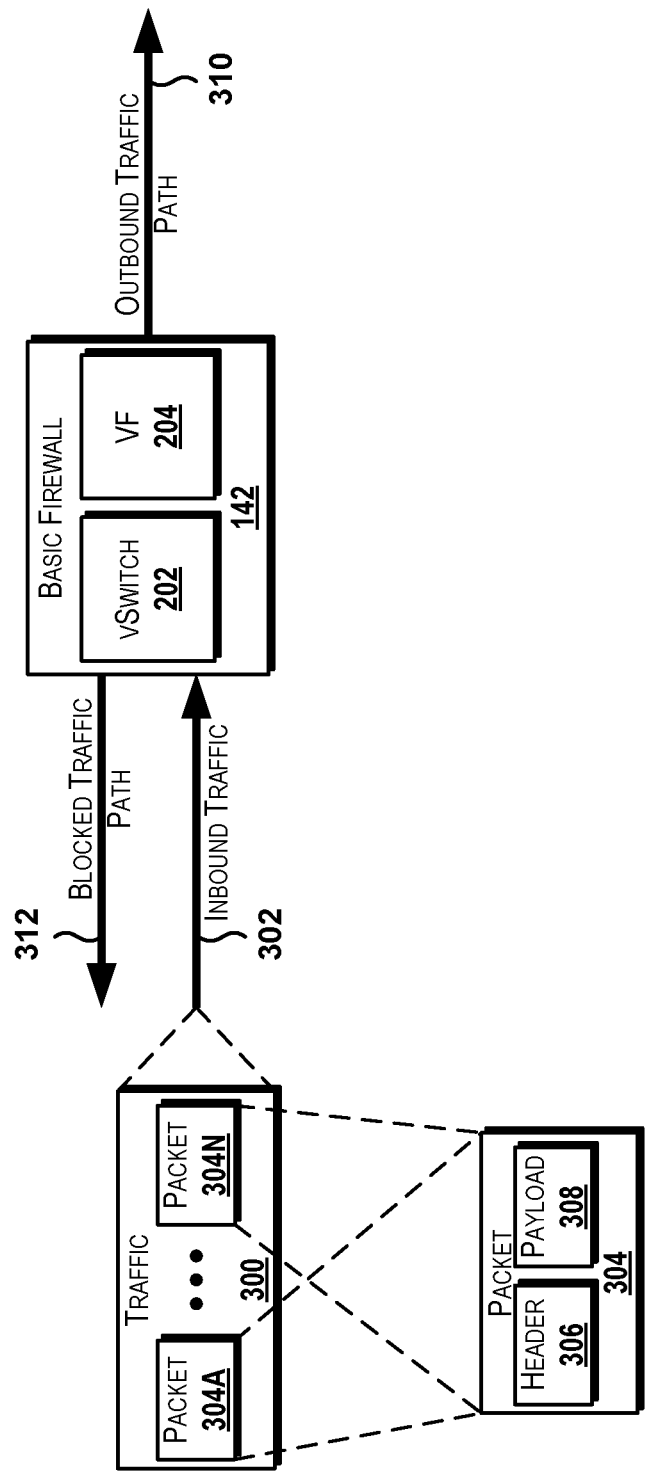
FIG. 3 is a line diagram that schematically illustrates aspects of a basic firewall, according to various embodiments of the concepts and technologies described herein.

Turning now to FIG. 3, additional aspects of a basic firewall 142 are illustrated and described in detail. In particular, FIG. 3 illustrates functions that can be performed and/or supported by the basic firewall 142, according to various embodiments of the concepts and technologies described herein. As illustrated and described above with reference to FIG. 2, the basic firewall 142 can be located in proximity to one service 134, in proximity to two or more services 134, in proximity to or within a traffic flow path that leads to one service 134, in proximity to or within a traffic flow path that leads from one service 134, in proximity to or within a traffic flow path that leads to two or more services 134, in proximity to or within a traffic flow path between two or more services 134, and/or elsewhere. As such, it should be understood that this example is illustrative and therefore should not be construed as being limiting in any way.

As shown in FIG. 3, traffic 300 can arrive at the basic firewall 142 via an inbound traffic path 302, which can correspond to a path along which traffic flows to the basic firewall 142. The inbound traffic 300 can correspond to a data flow, a traffic flow, and/or other data packets, strings of data packets, and/or sets of data packets 304A-N (hereinafter collectively and/or generically referred to as "data packets 304"). One or more of the data packets 304 can include a header 306, which can include various types of information about the packets 304, and a payload 308, which can include the content of the data packet 304.

In some embodiments, the basic firewall 142 can be configured to allow the traffic 300 to pass through the basic firewall 142 without any other operations or activities. In some other embodiments, the basic firewall 142 can perform various operations or activities on the traffic 300, as will be explained below, and allow the traffic 300 to exit the basic firewall 142. Regardless of whether or not other functions, operations, or activities are taken with respect to the traffic 300, the basic firewall 142 can allow the traffic 300 to exit the basic firewall 142 along an outbound traffic path 310, which can correspond to a path along which outbound traffic flows away from the basic firewall 142 when the traffic is allowed to pass through or past the basic firewall 142. Although not shown with respect to other paths illustrated in FIG. 3, it should be understood that the traffic 300 can exit the basic firewall 142 as a stream or set of data packets 304 as illustrated with respect to the traffic 300 arriving at the basic firewall 142. It should be understood that this example is illustrative and therefore should not be construed as being limiting in any way.

As noted above, the basic firewall 142 can complete various functions, operations, or activities with respect to the traffic 300. In particular, the basic firewall 142 can allow the traffic along the outbound traffic path 310 or block the traffic 300 as shown along the blocked traffic path 312. If the basic firewall 142 determines that traffic 300 is to be blocked, the traffic 300 can be returned to a source of the traffic 300, deleted, or otherwise impeded from proceeding through the basic firewall 142. In FIG. 3, the traffic 300 is shown being returned to a sender along the blocked traffic path 312. It should be understood that this example is illustrative and therefore should not be construed as being limiting in any way.

Figure 4:
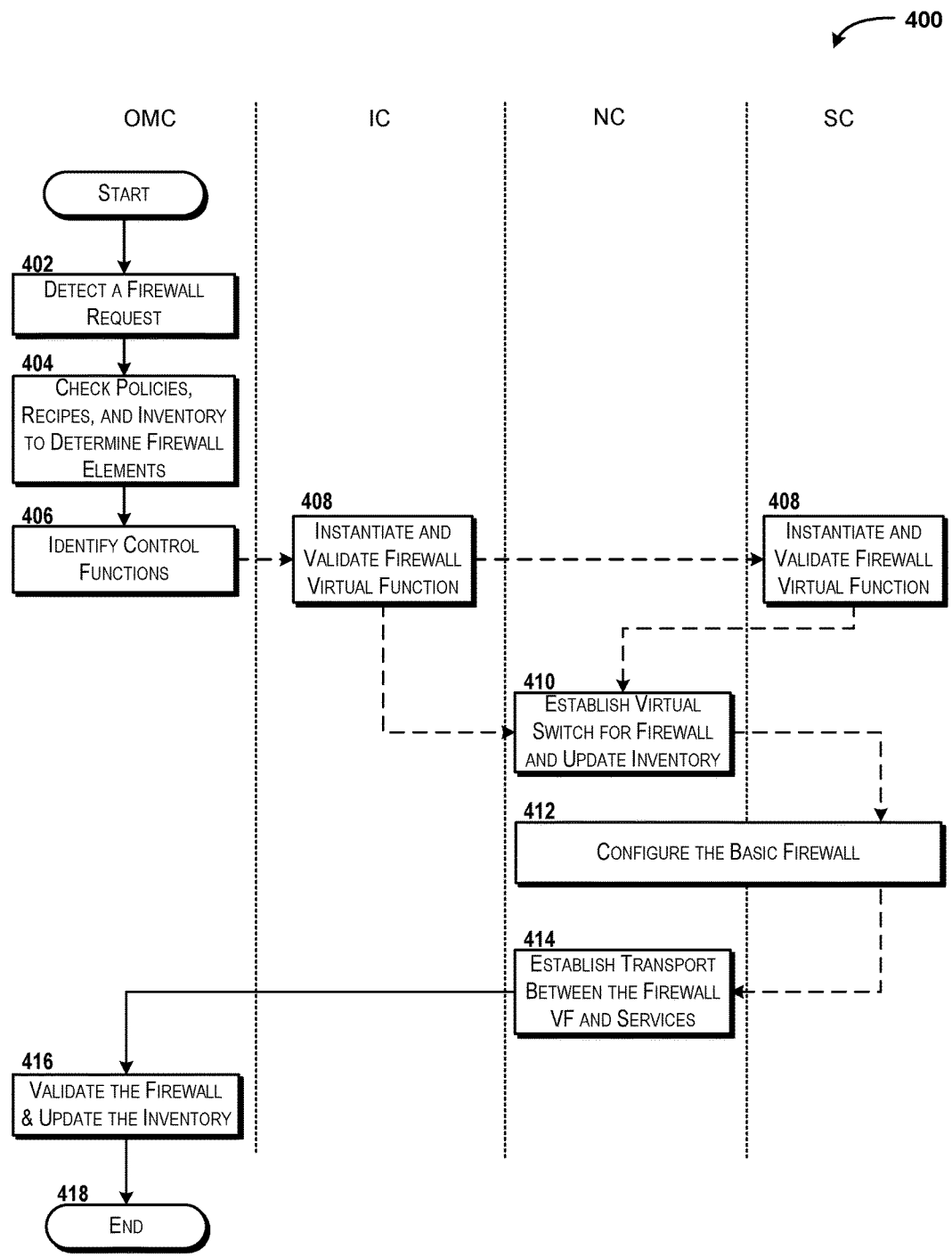
FIG. 4 is a flow diagram showing aspects of a method for instantiating a basic firewall, according to an illustrative embodiment of the concepts and technologies described herein.

Turning now to FIG. 4, aspects of a method 400 for instantiating a basic firewall 142 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 or the computer system 200, to perform one or more operations and/or causing the processor to direct other components of the computing system or device to perform one or more of the operations.

For purposes of illustrating and describing the concepts of the present disclosure, the methods disclosed herein are described as being performed by the control system 102 or the computer system 200 via execution of one or more software modules such as, for example, the modules illustrated and described in FIGS. 1-2 including, but not limited to, the operations management controller 106, the infrastructure control 112, the network control 118, and/or the service control 122. It should be understood that additional and/or alternative devices and/or network nodes can provide the functionality described herein via execution of one or more modules, applications, and/or other software including, but not limited to, the modules shown in FIGS. 1-2. Furthermore, although the particular modules are mentioned as being capable of providing the disclosed operations, it should be understood that the illustrated embodiments are illustrative, and should not be viewed as being limiting in any way.

The method 400 begins at operation 402. At operation 402, the control system 102 can detect a request for a basic firewall 142 ("firewall request"). The firewall request can correspond to an order for a basic firewall 142, a request to instantiate a new basic firewall 142, a request to terminate a basic firewall 142, or the like. It should be understood that the control system 102 can detect the request in operation 402 or receive the request. In the embodiment shown in FIG. 4, the firewall request detected in operation 402 can correspond to a request to create the new basic firewall 142.

In response to the firewall request (or in response to detecting the firewall request), the control system 102 can begin operations as illustrated and described herein. In some embodiments, the control system 102 can perform operation 402 by executing the operations management controller 106 and/or functionality associated with the operations management controller 106 as illustrated in FIG. 4. It should be understood that this example is illustrative and therefore should not be construed as being limiting in any way.

From operation 402, the method 400 proceeds to operation 404. At operation 404, the control system 102 can check one or more policies, recipes, and/or inventory to determine firewall elements to include in a basic firewall 142 that is responsive to the firewall request detected in operation 402. Thus, the control system 102 can determine a virtual switch 202 and a basic firewall virtual function 204 that are to provide the functionality of the basic firewall 142 requested by way of the firewall request. At operation 404, the control system 102 also can check one or more policy rules to determine how a basic firewall 142 should be created and/or various features, requirements, architecture, resources, and/or operational framework associated with such a basic firewall 142.

According to various embodiments of the concepts and technologies described herein, operation 404 can include determining that a basic firewall 142 is to be created as a standalone element and that the basic firewall 142 is to be located in a proximity of one or more services 134. In some embodiments, the control system 102 can perform operation 404 by executing the operations management controller 106 and/or functionality associated with the operations management controller 106 as illustrated in FIG. 4. It should be understood that this example is illustrative and therefore should not be construed as being limiting in any way.

From operation 404, the method 400 proceeds to operation 406. At operation 406, the control system 102 can identify an infrastructure control function, a network control function, and/or a service control function for the basic firewall 142 that is requested by way of the firewall request received or detected in operation 402. According to various embodiments of the concepts and technologies described herein, the control system 102 can select an appropriate infrastructure control function, network control function, and/or service control function from any number of existing control functions to control the basic firewall 142 and/or the components of the basic firewall 142.

In some other embodiments, the control system 102 may determine that the appropriate service control function does not exist and, in response to making such a determination, can create the service control function that will control the basic firewall 142 and/or its basic firewall virtual function 204. Thus, it should be understood that in addition to designating or selecting an infrastructure control function, network control function, and a service control function, operation 406 can include creating and/or allocating a service control function. In some embodiments, the control system 102 can perform operation 406 by executing the operations management controller 106 and/or functionality associated with the operations management controller 106 as illustrated in FIG. 4. It should be understood that this example is illustrative and therefore should not be construed as being limiting in any way.

From operation 406, the method 400 proceeds to operation 408. At operation 408, the control system 102 can instantiate and validate one or more basic firewall virtual functions 204 of the basic firewall 142. In some other embodiments, an existing basic firewall virtual function 204 can be identified and dedicated to provide functionality associated with the basic firewall 142 instead of being instantiated. According to some embodiments, the basic firewall virtual functions 204 can be created by deploying an image of the basic firewall virtual function 204 to a virtual machine. As such, operation 408 can include instantiating a virtual machine, in some embodiments, and if so, the virtual machine instantiated in operation 408 can include a basic firewall virtual function 204 if requested or instructed by an entity such as the operations management controller 106.

According to various embodiments of the concepts and technologies described herein, the instantiation of the basic firewall virtual function 204 can be completed by one or more of the operations management controller 106, the infrastructure control 112, the service control 122, and/or other elements of the control system 102. Thus, while FIG. 4 shows the instantiation of the basic firewall virtual function 204 at the service control 122, it should be understood that this embodiment is one example and should not be construed as being limiting in any way. In particular, in some embodiments the infrastructure control 112 can instantiate one or more virtual machines and the service control 122 can load one or more images to the virtual machines where the images can include the basic firewall virtual function 204. As such, the operation 408 can be performed by the infrastructure control 112 and the service control 122 in conjunction with one another, in some embodiments.

In some embodiments, a recipe for a basic firewall 142 can specify where and how the components of the basic firewall 142 will be instantiated. Thus, in some embodiments the recipe can specify that the service control 122 and/or the infrastructure control 112 can load the basic firewall virtual function 204 to the virtual machines or other resources allocated by the infrastructure control 112. Thus, it should be understood that the various components of the control system 102 can instantiate the basic firewall virtual function 204 in operation 408.

According to various embodiments, an event can be reported to an infrastructure DCAE process and/or the infrastructure inventory can be updated as part of operation 408. Although not shown in FIG. 4, it should be understood that the operations management controller 106 module of the control system 102 can instruct the infrastructure control 112, or a component thereof, to instantiate one or more virtual machines. Thus, in some embodiments of the concepts and technologies described herein, where the components of the control system 102 can be distributed across multiple devices, it should be understood that communications between the components can occur to trigger one or more of the operations illustrated and described herein. It should be understood that this example is illustrative and therefore should not be construed as being limiting in any way.

From operation 408, the method 400 proceeds to operation 410. At operation 410, the control system 102 can establish the virtual switch 202 associated with the basic firewall 142. To establish the virtual switch 202, the control system 102 can instantiate a new virtual switch 202, in some embodiments. In some other embodiments, an existing virtual switch 202 can be identified and dedicated to provide functionality associated with the basic firewall 142 instead of being instantiated. The control system 102 also can update the inventory 110 and/or one or more local inventories to reflect creation of the virtual switch 202. Additionally, operation 410 can include the network control 118 creating transport or ensuring that transport exists between the network control 118 and the virtual switch 202, as well as creating transport or ensuring that transport exists between the service control 122 and the basic firewall virtual function 204. In some embodiments, the control system 102 can perform operation 410 by executing the network control 118 and/or functionality associated with the network control 118 as illustrated in FIG. 4. It should be understood that this example is illustrative and therefore should not be construed as being limiting in any way.

In some embodiments of the method 400, the method 400 can proceed from operation 410 to operation 412. At operation 412, the control system 102 can configure the basic firewall 142 and/or one or more virtual switches 202 or basic firewall virtual functions 204 thereof. As used herein with reference to operation 412, "configuring" the basic firewall 142 and/or components thereof can refer to activating the basic firewall 142 and/or establishing a base or default configuration for the basic firewall 142. Thus, operation 412 can include specifying what application programming interfaces the basic firewall 142 will use, expose, or access, or the like.

It can be appreciated that if the virtual switches 202 or the basic firewall virtual functions 204 are instantiated and configured in operations 408-410, that operation 412 may be skipped or omitted. Thus, it can be appreciated that operation 412 may be performed by the control system 102, in some embodiments, where the infrastructure control 112 configures the components of the basic firewall 142 (the virtual switch 202 and the basic firewall virtual function 204) in operations 408-410 when these components are instantiated. It also should be understood that the control system 102 can perform configuration of the virtual switch 202 by executing the network control 118 and that the control system 102 can perform configuration of the basic firewall virtual function 204 by executing the service control 122. It should be understood that this example is illustrative and therefore should not be construed as being limiting in any way.

From operations 410 or 412, the method 400 proceeds to operation 414. At operation 414, the control system 102 can establish transport between the basic firewall 142 and other services 134 such as services 134 to which the basic firewall 142 is chained, from which the basic firewall 142 receives the traffic 300, to which the basic firewall 142 routes the traffic 300, combinations thereof, or the like. In operation 414, the control system 102 also can establish transport between the components of the basic firewall 142 and/or other entities such as services 134, the service control 122, the network control 118, combinations thereof, or the like. In some embodiments, the control system 102 can perform operation 414 by executing the network control 118 and/or functionality associated with the network control 118 as illustrated in FIG. 4. It should be understood that this example is illustrative and therefore should not be construed as being limiting in any way.

From operation 414, the method 400 proceeds to operation 416. At operation 416, the control system 102 can validate the basic firewall 142 end-to-end and update the inventory 110. In some embodiments, each of the scope domains can validate the basic firewall 142 or portions thereof associated with that scope domain instead of the control system 102 providing end-to-end validation. In some embodiments in which the operations management controller 106 validates the basic firewall 142 end-to-end, the control system 102 can perform operation 416 by executing the operations management controller 106 and/or functionality associated with the operations management controller 106 as illustrated in FIG. 4. In some embodiments in which each of the scope domains validates a portion of the basic firewall 142, the control system 102 can perform operation 416 by executing the operations management controller 106, the infrastructure control 112, the network control 118, and/or the service control 122 and/or functionality associated with these modules. It should be understood that this example is illustrative and therefore should not be construed as being limiting in any way.

From operation 416, the method 400 proceeds to operation 418. The method 400 ends at operation 418.

Figure 5:
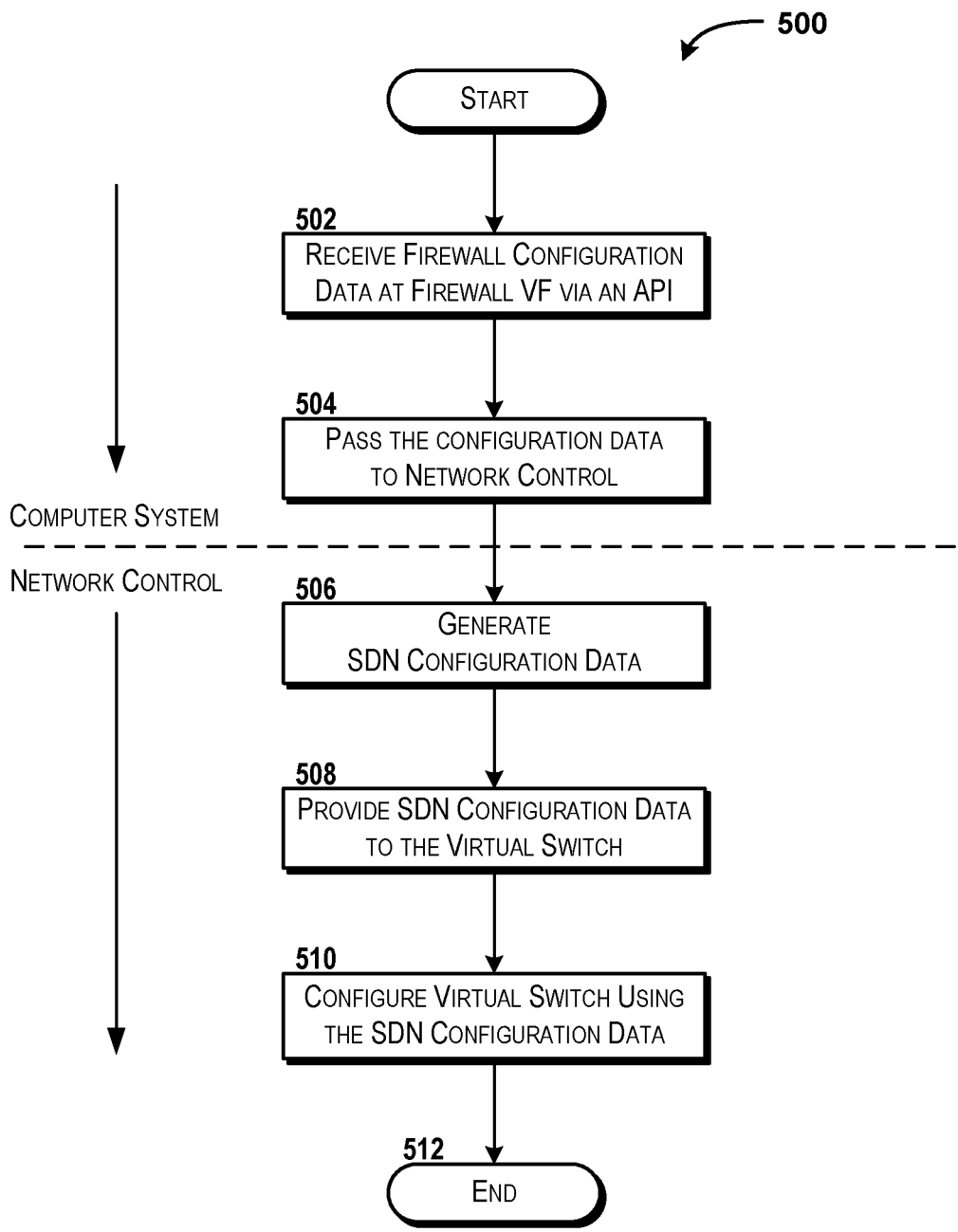
FIG. 5 is a flow diagram showing aspects of a method for configuring a basic firewall, according to an illustrative embodiment of the concepts and technologies described herein.

Turning now to FIG. 5, aspects of a method 500 for configuring a basic firewall 142 will be described in detail, according to an illustrative embodiment. The method 500 begins at operation 502. At operation 502, the computer system 200 can receive firewall configuration data 206. Specifically, the firewall configuration data 206 can be received at a basic firewall virtual function 204 hosted on the computer system 200 via an API exposed by the computer system 200 and/or other entities.

As explained above, the firewall configuration data 206 can include data that instructs the basic firewall virtual function 204 and/or other components of the basic firewall 142 regarding how the basic firewall 142 is to enforce one or more match action tables 208. Thus, the firewall configuration data 206 can include instructions for inspecting traffic 300, how to handle the traffic 300, actions to take in response to receiving and/or analyzing the traffic 300, combinations thereof, and the like. The firewall configuration data 206 also can define how the traffic 300 is handled during and/or after the analysis of the basic firewall 142.

From operation 502, the method 500 proceeds to operation 504. At operation 504, the computer system 200 can pass (e.g., forward, transmit, etc.) the firewall configuration data 206 to the network control 118. As noted above, the firewall configuration data 206 can define how the basic firewall 142 is to perform the firewall functionality, how packets and/or other data flows are to be handled during or after performing the firewall functionality, what match action tables 208 are to be used to enforce the firewall on the traffic 300, combinations thereof, or the like.

From operation 504, the method 500 proceeds to operation 506. At operation 506, the network control 118 can generate SDN configuration data 210. The network control 118 can generate the SDN configuration data 210 for forwarding to the virtual switch 202, which can be hosted and/or executed by the computer system 200 and/or the control system 102. The SDN configuration data 210 can be used to configure the virtual switch 202 to take certain actions without involving the basic firewall virtual function 204. For example, the SDN configuration data 210 can be generated to instruct the virtual switch 202 to block traffic 300, to allow traffic 300, or the like.

From operation 506, the method 500 proceeds to operation 508. At operation 508, the network control 118 can provide the SDN configuration data 210 to the virtual switch 202. The SDN configuration data can instruct the virtual switch 202 as to how traffic will be filtered by the virtual switch 202, as well as what other data (e.g., match action tables 208 and/or other data structures) that will be relied upon by the virtual switch 202 to filter traffic 300.

From operation 508, the method 500 proceeds to operation 510. At operation 510, the computer system 200 and/or the control system 102 can configure the virtual switch 202 based upon the SDN configuration data 210. Thus, it can be appreciated that the virtual switch 202 can be configured using SDN technologies and without direct involvement from the basic firewall virtual function 204 and/or the service control 122. It should be understood that this example is illustrative and therefore should not be construed as being limiting in any way. It should be understood that the functionality of operation 510 can be combined with the functionality of 508, in some embodiments.

From operation 510, the method 500 proceeds to operation 512. The method 500 ends at operation 512.

Figure 6:
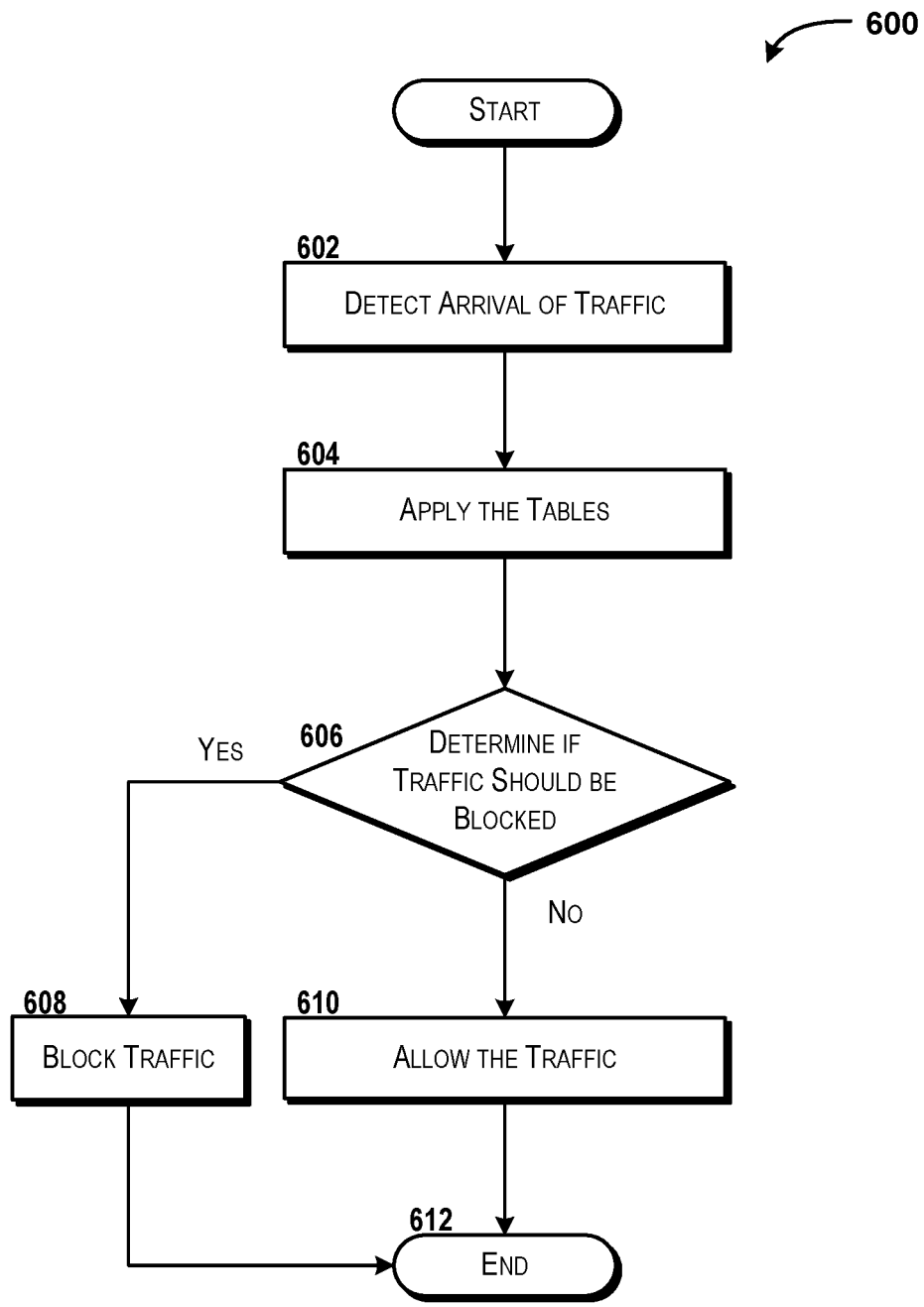
FIG. 6 is a flow diagram showing aspects of a method for using a basic firewall, according to an illustrative embodiment of the concepts and technologies described herein.

Turning now to FIG. 6, aspects of a method 600 for using a basic firewall 142 will be described in detail, according to an illustrative embodiment. The method 600 begins at operation 602. At operation 602, traffic 300 can arrive at the virtual switch 202 hosted by the computer system 200. Thus, in operation 602, the computer system 200 can, via execution of the virtual switch 202, detect arrival of the traffic 300 at the virtual switch 202. Because the traffic 300 may or may not be detected, and because the traffic 300 may arrive at the basic firewall 142 in additional and/or alternative ways, it should be understood that this example is illustrative and therefore should not be construed as being limiting in any way.

From operation 602, the method 600 proceeds to operation 604. At operation 604, the computer system 200 can apply the match action tables 208 and the SDN configuration data 210 to determine an action to take with respect to the traffic 300 received (or detected) in operation 602. Thus, it can be appreciated that the SDN configuration data 210 and the match action tables 208 can define rules or policies that define how traffic 300 is handled based upon a source, destination, or route associated with the traffic 300; based upon contents of the transport headers 306 of one or more data packets 304 of the traffic 300; combinations thereof; or the like. It should be understood that the analysis illustrated in operation 606 can be completed by the virtual switch 202, in some embodiments and therefore can occur at the transport layer of a network 104 instead of the application or service layer of the network 104.

As such, it can be appreciated that various embodiments of the concepts and technologies described herein can enable creation of firewalls without any use of applications or services to provide the actual filtering of traffic. Rather, as explained above, the application or service layer of the network 104 can provide the basic firewall virtual function 204 and therefore can enable configuration of the virtual switch 202. The virtual switch 202, on the other hand, can enforce the match action tables 208 on traffic 300 to effect firewall functionality. This can realize savings in terms of transport and processing power, as application functionality does not need to be invoked at runtime to realize the functionality of the basic firewall 142 (rather, the applications may be invoked only at configuration time). It should be understood that this example is illustrative and therefore should not be construed as being limiting in any way.

If the computer system 200 determines, in operation 604, that a rule for the traffic 300 does not exist in the match action table 208, the computer system 200 can query the network control 118 to determine how to handle the traffic. It should be understood that this example is illustrative and therefore should not be construed as being limiting in any way.

From operation 604, the method 600 proceeds to operation 606. At operation 606, the computer system 200 can determine if the traffic 300 should be blocked. The determination illustrated in operation 606 can be made based upon the application of the match action tables 208 and the SDN configuration data 210 as illustrated in operation 604. If the computer system 200 determines, in operation 606, that the traffic 300 should be blocked, the method 600 can proceed to operation 608. At operation 608, the computer system 200 can block the traffic 300. It can be appreciated with reference to FIG. 3 that the blocked traffic 300 can be returned to a sender via the blocked traffic path 312 shown in FIG. 3 or otherwise blocked. It should be understood that this example is illustrative and therefore should not be construed as being limiting in any way.

If the computer system 200 determines, in operation 606, that the traffic 300 should not be blocked, the method 600 can proceed to operation 610. At operation 610, the computer system 200 can allow the traffic 300. Thus, at operation 610, the computer system 200 can route the traffic 300 (or allow routing of the traffic 300) to the destination or location identified in the headers 306 of the packets 304. It can be appreciated that the computer system 200 may not actively route the traffic 300 and that the computer system 200 may instead output the traffic 300 for routing in accordance with a header 306 or modified header 306. Because routing of the traffic 300 can occur in a number of manners, various embodiments of routing the traffic 300 will not be described in additional detail.

From operation 610, the method 600 can proceed to operation 612. The method 600 also can proceed to operation 612 from operation 608. The method 600 can end at operation 612.

Figure 7:
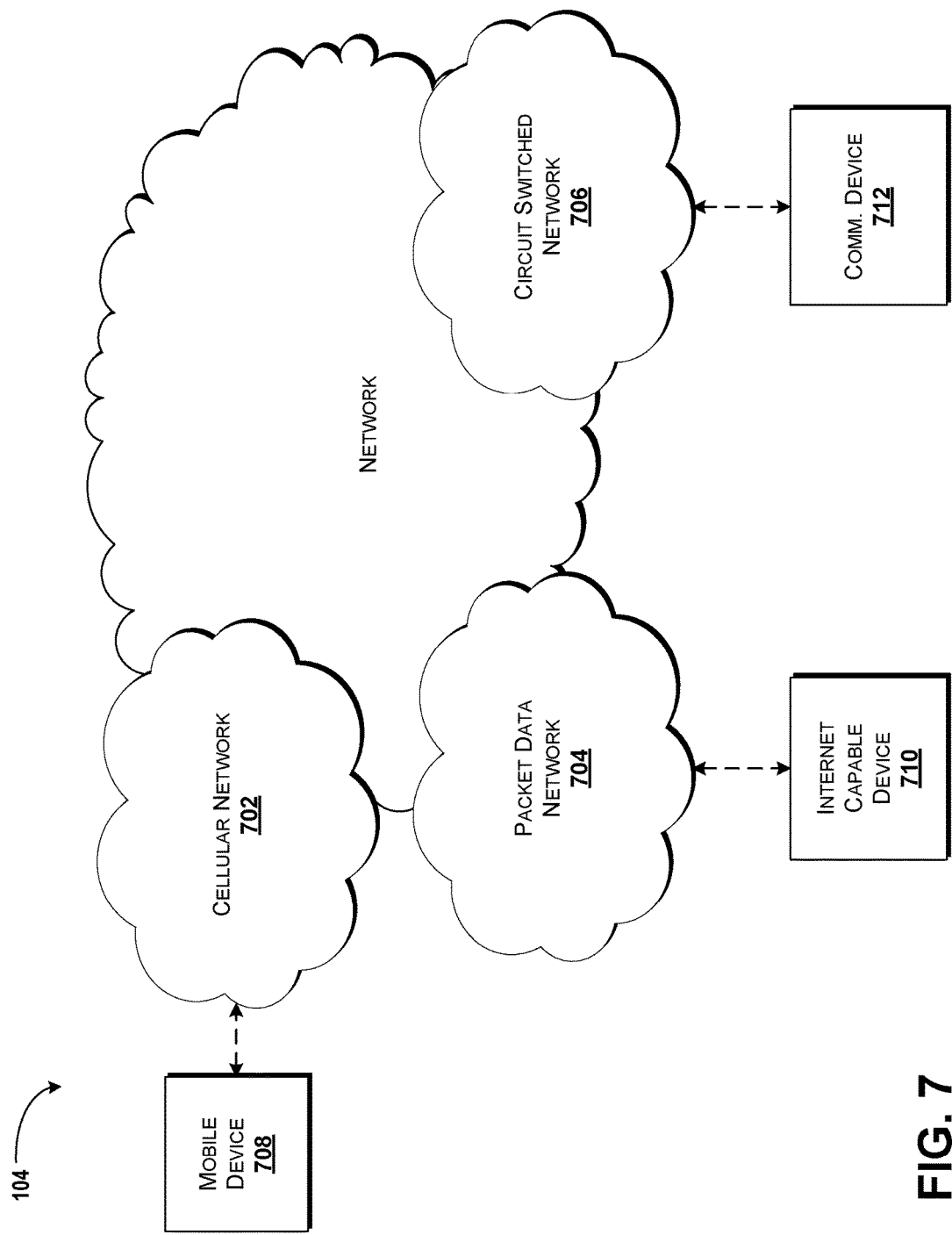
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

FIG. 8 is a block diagram illustrating a computer system 800 configured to provide the functionality described herein for creating and/or using basic firewalls 142, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the operations management controller 106, the infrastructure control 112, the network control 118, the service control 122, the basic firewall 142, and/or other modules illustrated and described herein. These and/or other programs can be embodied in computer-readable media containing instructions that, when executed by the processing unit 802, perform one or more of the methods 400, 500, 600 described in detail above with respect to FIGS. 4-6. According to embodiments, the program modules 816 may be embodied in hardware, software, firmware, or any combination thereof. Although not shown in FIG. 8, it should be understood that the memory 804 also can be configured to store the policies, the service creation database 108, the inventory 110, the firewall configuration data 206, the SDN configuration data 210, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a basic firewall using a virtual networking function have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
detecting, at a control system, a request to instantiate a virtual basic firewall on infrastructure that comprises a network transport layer, an application service layer, and a computer system,
determining, based on a definition of components of the virtual basic firewall, firewall elements that are to be instantiated to provide the virtual basic firewall, wherein the firewall elements comprise a virtual switch and a basic firewall virtual function,
triggering instantiation of the basic firewall virtual function on the computer system, and
executing a network control function to establish network transport between the virtual switch and the basic firewall virtual function, wherein the virtual basic firewall is configured to filter traffic using the virtual switch on the network transport layer of the infrastructure, and wherein the virtual switch does not operate on the application service layer of the infrastructure.

2. The system of claim 1, wherein the virtual switch is controlled by the network control function, and wherein the basic firewall virtual function is controlled by a service control function.

3. The system of claim 1, wherein the network control function controls the virtual switch using software defined networking configuration data, and wherein the basic firewall virtual function directs the network control function to create the software defined networking configuration data that configures the virtual switch.

4. The system of claim 3, wherein the virtual basic firewall is configured to filter traffic using a match action table that is provided to the virtual switch by the network control function.

5. The system of claim 1, wherein the basic firewall virtual function is configured by firewall configuration data received by the basic firewall virtual function via an application programming interface exposed by the basic firewall virtual function.

6. A method comprising:
detecting, at a control system comprising a processor and a memory, a request to instantiate a virtual basic firewall on infrastructure that comprises a network transport layer, an application service layer, and a computer system;
determining, by the processor and based on a definition of components of the virtual basic firewall, firewall elements that are to be instantiated to provide the virtual basic firewall, wherein the firewall elements comprise a virtual switch and a basic firewall virtual function;
triggering, by the processor, instantiation of the basic firewall virtual function on the computer system; and
executing, by the processor, a network control function to establish network transport between the virtual switch and the basic firewall virtual function, wherein the virtual basic firewall is configured to filter traffic using the virtual switch on the network transport layer of the infrastructure, and wherein the virtual switch does not operate on the application service layer of the infrastructure.

7. The method of claim 6, wherein the virtual switch is controlled by the network control function, and wherein the basic firewall virtual function is controlled by a service control function.

8. The method of claim 6, wherein the network control function controls the virtual switch using software defined networking configuration data.

9. The method of claim 8, wherein the virtual basic firewall is configured to filter traffic using a match action table that is provided to the virtual switch by the network control function.

10. The method of claim 8, wherein the basic firewall virtual function directs the network control function to create the software defined networking configuration data that configures the virtual switch.

11. The method of claim 6, wherein the basic firewall virtual function is configured by firewall configuration data received by the basic firewall virtual function via an application programming interface exposed by the basic firewall virtual function.

12. The method of claim 6, further comprising validating the basic firewall virtual function.

13. The method of claim 12, wherein validating the basic firewall virtual function comprises executing an infrastructure control function to validate the basic firewall virtual function.

14. The method of claim 12, wherein validating the basic firewall virtual function comprises executing a service control function to validate the basic firewall virtual function.

15. A computer storage medium having computer-executable instructions stored thereon that, when executed by a processor, cause the processor to perform operations comprising:
detecting, at a control system, a request to instantiate a virtual basic firewall on infrastructure that comprises a network transport layer, an application service layer, and a computer system;
determining, based on a definition of components of the virtual basic firewall, firewall elements that are to be instantiated to provide the virtual basic firewall, wherein the firewall elements comprise a virtual switch and a basic firewall virtual function;
triggering instantiation of the basic firewall virtual function on the computer system; and
executing a network control function to establish network transport between the virtual switch and the basic firewall virtual function, wherein the virtual basic firewall is configured to filter traffic using the virtual switch on the network transport layer of the infrastructure, and wherein the virtual switch does not operate on the application service layer of the infrastructure.

16. The computer storage medium of claim 15, wherein the virtual switch is controlled by the network control function, and wherein the basic firewall virtual function is controlled by a service control function.

17. The computer storage medium of claim 15, wherein the network control function controls the virtual switch using software defined networking configuration data.

18. The computer storage medium of claim 17, wherein the basic firewall virtual function directs the network control function to create the software defined networking configuration data that configures the virtual switch.

19. The computer storage medium of claim 17, wherein the virtual basic firewall is configured to filter traffic using a match action table that is provided to the virtual switch by the network control function.

20. The computer storage medium of claim 15, wherein the basic firewall virtual function is configured by firewall configuration data received by the basic firewall virtual function via an application programming interface exposed by the basic firewall virtual function.

* * * * *